US 6,591,356 B2

(12) United States Patent
McMurdie et al.

(10) Patent No.: US 6,591,356 B2
(45) Date of Patent: *Jul. 8, 2003

(54) CLUSTER BUSTER (75) Inventors: Michael McMurdie, Pleasanton, CA (US); Michel Berhan, San Jose, CA (US)

(73) Assignee: Roxio, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,567
(22) Filed: Jul. 17, 1998
(65) Prior Publication Data
US 2002/0019907 A1 Feb. 14, 2002

(51) Int. Cl.[7] .............................................. G06F 12/00
(52) U.S. Cl. ..................... 711/206; 711/112; 707/205
(58) Field of Search ............................. 711/4, 111, 112, 711/203, 206, 202; 707/205

(56) References Cited

U.S. PATENT DOCUMENTS

| 5,193,184 | A | * | 3/1993 | Belsan et al. | 395/600 |
| 6,148,369 | A | * | 11/2000 | Ofer et al. | 711/114 |
| 6,216,202 | B1 | * | 4/2001 | D'Errico | 711/112 |
| 6,366,988 | B1 | * | 4/2002 | Skiba et al. | 707/203 |

OTHER PUBLICATIONS

Partition Magic User Guide. PowerQuest Corporation. 1997. pp. 31–33, 132–133.*
PC Magazine, "Drive Size vs. Storage Efficiency", Jeff Prosise, pp. 1–5, (Jun. 27, 1995).
PC Magazine, "Can VFAT Handle Large Disks", Jeff Prosise, pp. 1–4 (Oct. 10, 1995).
PC Magazine, "The Case Of The Wasted Clusters", Jim Seymour, pp. 1–2 (Feb. 6, 1996).
PC Magazine, "Don't Get Gigged", Jim Seymour, pp. 1–2 (Oct. 10, 1995).
PC Magazine, "Is VFAT Ready For Prime Time?", Jeff Prosise, pp. 1–5 (Jun. 13, 1995).

* cited by examiner

Primary Examiner—Kevin Verbrugge
(74) Attorney, Agent, or Firm—Martine & Penilla, LLP (57) ABSTRACT A method and a system are provided to improve storage space utilization in a file management system with a fixed number of clusters without increasing the number of volumes visible to the user. This is accomplished by merging together multiple logical partitions created on a physical volume into a single virtual partition. This allows for the use of smaller, more efficient logical partitions while still presenting to the user/application a single large volume. As a result, the user is able to deal with a single volume, greatly reducing the burden of remembering on which volume each file is located, but, at the same time, the user is able to reap the benefits of the efficient storage allocation deriving from a reduced cluster size.

11 Claims, 13 Drawing Sheets

CLUSTER BUSTER

BACKGROUND OF THE INVENTION

1. Field of the Invention

The present invention relates to file management systems for general purpose computers and, in particular, to file management systems using a fixed size indexing system.

2. Description of Related Art

Figure 1:
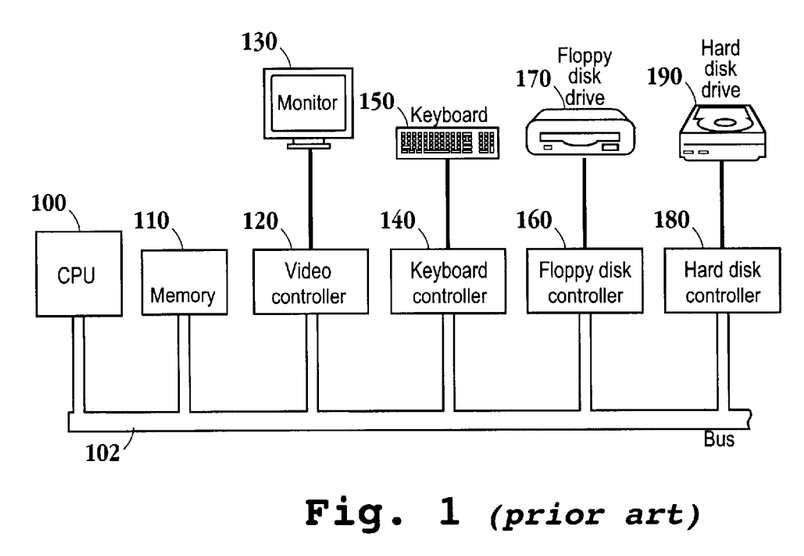
FIG. 1 illustrates the typical structure of a general purpose computer.

A general purpose computer 155 (FIG. 1) typically includes a central processing unit (CPU) 100 that executes a user application stored in a memory 110 (i.e., in primary storage); input/output devices such as a monitor 130 and a keyboard 150; and secondary storage devices such a floppy disk drive 170 and hard-disk drive 190. A bus 102 is used to allow the different components of computer 155 to communicate among each other. Each input/output device and each secondary storage device is typically connected to bus 102 by a controller, e.g., monitor 130 is connected to bus 102 by a video controller 120; keyboard 150 is connected to bus 102 by a keyboard controller 140; floppy disk 170 is connected to bus 102 by a floppy disk controller 160; and hard-disk drive 190 is connected to bus 102 by a hard disk controller 180.

Typically, the user application executing on CPU 100 does not communicate directly with either the I/O devices or the secondary storage devices. Rather, the user application executes a call to an operating system function that in turn communicates with the device designated in the call. Thus, one function of the operating system is to facilitate the transfer of information between secondary storage devices 170 and 190 and a user application executing on CPU 100.

The operating system typically employs a file management system to store information on secondary storage devices such as hard-disk drives and floppy-disk drives. The file management system organizes the physical storage space on a secondary storage device into a logical space that can be addressed using the file management system. This is accomplished by designating specific areas of the secondary device to serve as storage areas for indices to the rest of the storage space, which is made available to the operating system to store user/application generated files.

One of the key functions of the operating system is to present to the application a single uniform interface (e.g., a naming system) that allows the application to find, open, close, read and write a file without regard to the underlying media or hardware. This is accomplished in part by using a uniform naming convention for all the files incorporated into the file system. Using this uniform naming convention, an application can open a file using a uniform name and a standard operating system call, and then proceed to read and write that file, without regard to the physical location of the data on the media or the physical characteristics of the underlying device. It is the responsibility of the operating system to translate this generic file operation into a set of device specific operations, insulating the application from this level of complexity.

In the file management system of the MS-DOS/ WINDOWS environment, for example, part of the naming convention involves the addressing of each logical volume by a letter (such as the ubiquitous C:), with further subdivisions implemented via file names (e.g., C:\DOC), or directories and file names (e.g., C:\DIR\DOC). Other logical volumes are addressed by other letters (e.g., A:, B:, etc.), with each logical volume spanning a certain amount of space. Typically, the physical volume (e.g., a hard-disk drive) is partitioned into one or more logical volumes. If a hard-disk drive has a single partition, the volume address is the same for the complete storage space of the device. However, if the hard-disk drive is partitioned into two logical volumes, there are two separate volume addresses associated with the hard-disk drive.

The file management system of the MS-DOS/WINDOWS operating system, for example, translates a call to a particular drive letter and file name into device specific calls at the hardware level. An open call on a file named C:\FILE.ONE, for instance, is translated by the file management system of the MS-DOS operating system into a set of low-level instructions to read or write a specific set of blocks on a hard-disk drive, based on the information contained in the FAT for the partition corresponding to the logical volume C:.

As indicated above, the actual storage space on a physical hard-disk drive is usually divided into partitions. The storage space within each partition is addressed by means of an indexing scheme. In the file management system of the MS-DOS/WINDOWS operating system, for example, a File Allocation Table (FAT) is used to locate individual files within each partition. The FAT is a table that can hold up to 65,535 entries for accessing the storage space allocated to the partition. As the maximum number of entries in the FAT is fixed, the smallest unit of storage that can be addressed by the file system (often referred to as a "cluster") is dependent on the size of the partition.

Figure 2:
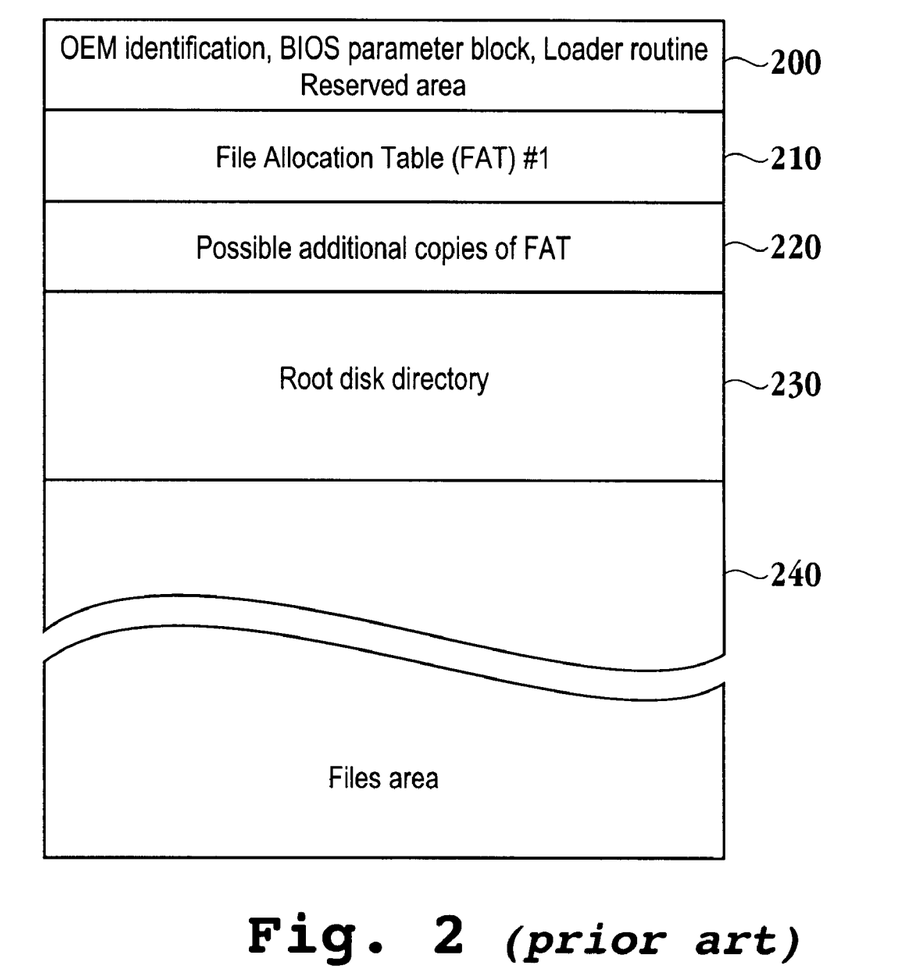
FIG. 2 shows the structure of a file system using a file allocation table (FAT).

A block diagram of a typical structure for the storage area of a secondary storage device as defined by the MS-DOS/WINDOWS operating system is shown in FIG. 2. A first section 200 of the device's storage area is reserved for a bootstrap record. The bootstrap record includes an OEM identification, a BIOS parameter block, and a loader routine. The BIOS parameter block and the loader routine allow the operating system to load the instructions necessary to access the information stored on the device. Following the bootstrap record in first section 200 are a file allocation table (FAT) 210, an optional copy of the FAT 220, which is used as a backup in case FAT 210 is corrupted, a root disk directory 230, and, finally, a file area 240.

Figure 3:
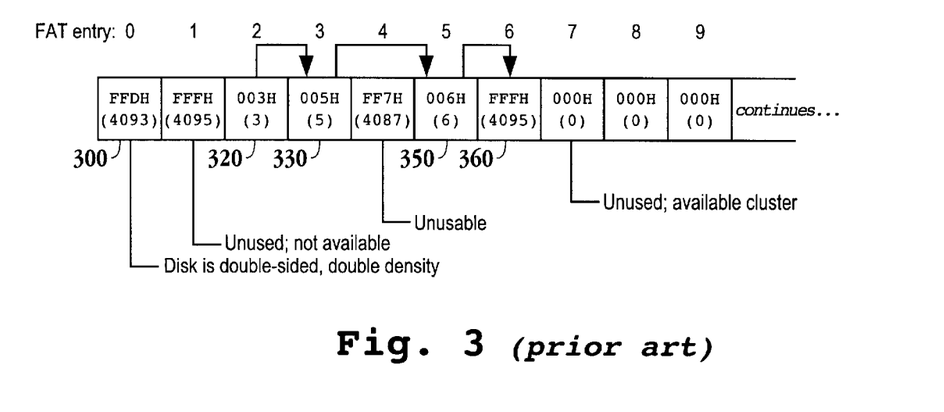
FIG. 3 shows the typical organization of FAT entries.

FIG. 3, each FAT entry 300 represents a specific cluster in a partition. When the file management system of the MS-DOS operating system writes a file on a partition, the location of the first cluster in which the file is written is stored in root disk directory 230 (FIG. 2). The FAT entry for a first cluster 320 in the file, in turn, contains the location of a FAT entry for a next cluster 330 in the file, which in turn contains a FAT entry for a next cluster 350 in the file. The FAT entry for a last cluster 360 in the file, on the other hand, contains a special end of file marker (typically, the hexadecimal value FFF8-FFFF). Thus, the file management system of the MS-DOS operating system can access the entire file by tracing through the chain of cluster addresses stored in the various FAT entries.

Unfortunately, as indicated above, the number of entries in a FAT is fixed irrespective of the physical size of the logic volume. Thus, a 32 megabyte (MB) partition and a 2 gigabyte (GB) partition have the same number of FAT entries, which in turn means that each partition has the same number of clusters. As a result, the cluster size is dependent upon the size of the partition. In the 32 MB partition, for instance, the cluster size is 512 bytes (32MB/65,535=512). Conversely, in the a 2 GB partition, the cluster size is 32,768 bytes or 32 kilobytes.

As one might expect, dividing a partition into a fixed number of discrete segments can cause problems on large volumes. The reason is that for a 2 GB partition, if a file requires one byte more than is available in cluster (e.g., 32,769 bytes) the file management system allocates another cluster to store the one byte. PC industry writers estimate that on a typical 1.6 GB hard-disk drive, as much as 40% of the space is wasted because of cluster size limitations imposed by the FAT.

One solution to this problem is to divide the physical drive into smaller partitions or volumes so that the cluster size is smaller and the percentage of space that wasted in partially filled clusters is reduced. This leads to the problem of increased complexity for the user, forced to deal with many volumes instead of a single volume. Therefore, up to this point the user has had to sacrifice ease-of-use for sake of efficient space allocation.

Hence, file management systems that use a fixed number of clusters, such as the File Address Table (FAT) file management system used by the DOS, DOS/WINDOWS and WINDOWS 95 operating systems, have two significant drawbacks. First, these file management systems fail to manage secondary storage space, such as hard-disk drives or optical disks, efficiently. Second, these file management systems do not allow the user to deal with the file management system in a manner independent from the physical characteristics of the secondary storage devices. DOS, WINDOWS, and WINDOWS 95 are trademarks of Microsoft Corp. of Redmond, Wash.

SUMMARY OF THE INVENTION

The ClusterBuster addresses both of these problems by merging together the multiple logical partitions created on a physical volume into a single virtual partition. This allows for the use of smaller, more efficient partitions while still presenting to the user/application a single large volume.

As a result, the user is able to deal with a single volume, greatly reducing the burden of remembering on which volume each file is located, but, at the same time, the user is able to reap the benefits of the efficient storage allocation deriving from a reduced cluster size.

DETAILED DESCRIPTION OF THE INVENTION

Figure 4:
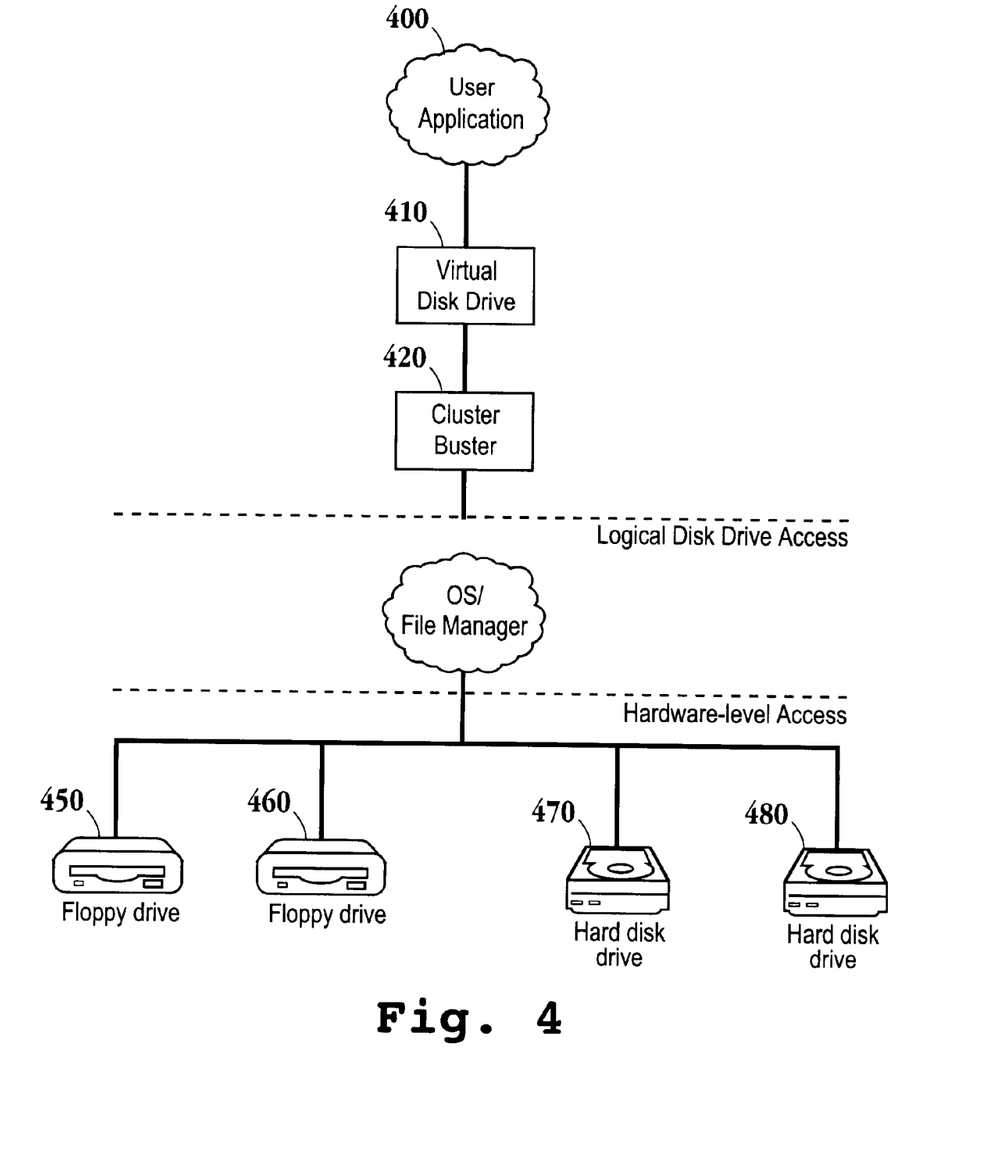
FIG. 4 is a graphic representation of the relationship between the present invention, the user's view of the file system and the operating system's view of the file system.

According to the principles of this invention, a user is no longer forced to choose between efficient disk space utilization and managing a number of logical volumes for large capacity secondary storage units. As illustrated in FIG. 4, using a computer process of this invention, referred to herein as ClusterBuster 420, a user/application 400 sees only a single large logic volume, which is a virtual disk drive 410. The user accesses data stored on virtual disk drive 410, and writes data to virtual disk drive 410 by using a single logical volume label (e.g., C:) and the conventional directory and file nomenclature associated with the operating system being used to address the data.

ClusterBuster 420 intercepts the accesses to virtual disk drive 410 and converts the virtual disk drive access into a logical device access that in turn is transmitted to file management system 430 of the operating system.

Specifically, the hard-disk drives 470 and 480, or other secondary storage units (e.g., floppy drives 450 and 460) in the user's computer system are partitioned into logical volume sizes that effectively utilize the storage space (e.g., for a FAT based file management system, the logical volume size is selected to minimize wasted space to the extent possible). Typically, a disk drive with one or more gigabytes of storage is partitioned into several smaller logical volumes. However, the user never sees the multiple logical volumes, and instead sees only the one virtual disk drive 410.

ClusterBuster 420 converts the virtual disk drive address supplied by the user into the appropriate logical volume address, and supplies that logical volume address to the operating system. Hence, ClusterBuster 420 converts a signal of a first type, a virtual disk drive address, to a signal of a second type, a logical disk drive address. One method for performing this conversion is described more completely below.

In an embodiment utilizing the MSDOS/WINDOWS, or WINDOWS 95 operating system, ClusterBuster 420 operates by hooking into the operating system below the Application Protocol Interface (API) provided to application 400 but above file management system 430. As indicated above, ClusterBuster 420 intercepts the application call to virtual disk drive 410, and converts the application call for an application call for the appropriate underlying logical volume.

For example, consider a system with two logical volumes with logical volume addresses C: and D:, respectively. Each logical volume has one directory that includes two files. A representation of the structure of the two logical volumes is shown in Table 1.

TABLE 1

| Volume | Directory | File |
|---|---|---|
| C: | Dir_One | File.1 |
| C: | Dir_One | File.2 |
| D: | Dir_Two | File.3 |
| D: | Dir_Two | File.4 |

However, a user is unaware that the logical volume associated with the address D: exists. With ClusterBuster 420 present, the user/application 400 would sees only a single virtual disk drive with address C: with the file structure shown in Table 2.

TABLE 2

| Volume | Directory | File |
|---|---|---|
| C: | Dir_One | File.1 |
| C: | Dir_One | File.2 |
| C: | Dir_Two | File.3 |
| C: | Dir_Two | File.4 |

Thus, according to the principles of this invention, the user operates on a single logical volume that, unknown to the user, is a virtual volume, while ClusterBuster 420 presents to the operating system's file management system 430 calls to the multiple volumes file management system 430 is currently set up to handle. This is graphically illustrated in FIG. 4. ClusterBuster 420 presents to user/application a single virtual disk drive 410, while ClusterBuster 420 presents to the operating system file management system 430 a series of logical device calls corresponding to the partitions on the physical storage devices, such as floppy-disk drives 450 and 460 and hard-disk drives 470 and 480.

Figure 5:
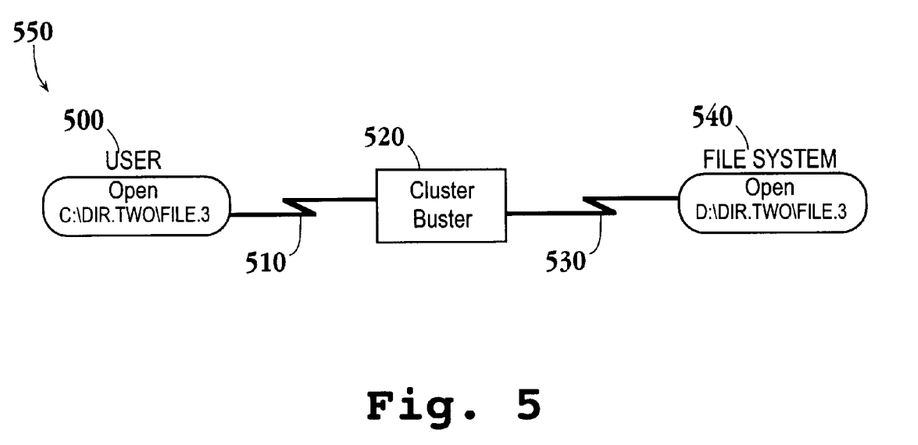
FIG. 5 is a graphic representation of the translation of file references during a file access in a computer system according to the present invention.

Assume that a user/application makes a request to open file C:\Dir_Two\File.3. This request is transmitted over line 510 to ClusterBuster 520 which translates this call into a request to open file D:\Dir_Two\File.3. and transmits such request to file system 540 over line 530. The file system 540 then completes the request on drive D: and returns completion status to ClusterBuster which then passes that information back to the calling application. Continuing, assume that a user/application makes a request to open file C:\Dir_One\File.1, which is transmitted over line 510 to ClusterBuster 520. Since the requested file exists on the requested volume, no translation is performed and the call is passed through unchanged. From the perspective of the file system two requests are issued, one to drive D: and the other to drive C:.

FIG. 5 illustrates the operation of system 550. Using the above scenario, assume that a user/application 500 makes a request to open file C:\Dir_Two\File.3, which is transmitted over line 510 to ClusterBuster 520. ClusterBuster 520 translates this call into a request to open file D:\Dir_Two\File.3 and transmits such request to file system 540 over line 530. Since file system 540 does not see the initial request, file system 540 manages two fully intact and complete volumes. When file system 540 is ready to return data to user/application 500, ClusterBuster 520 takes care of storing the information in file D:\Dir_Two\File.3 transparently to user/application 530.

Figure 6A:
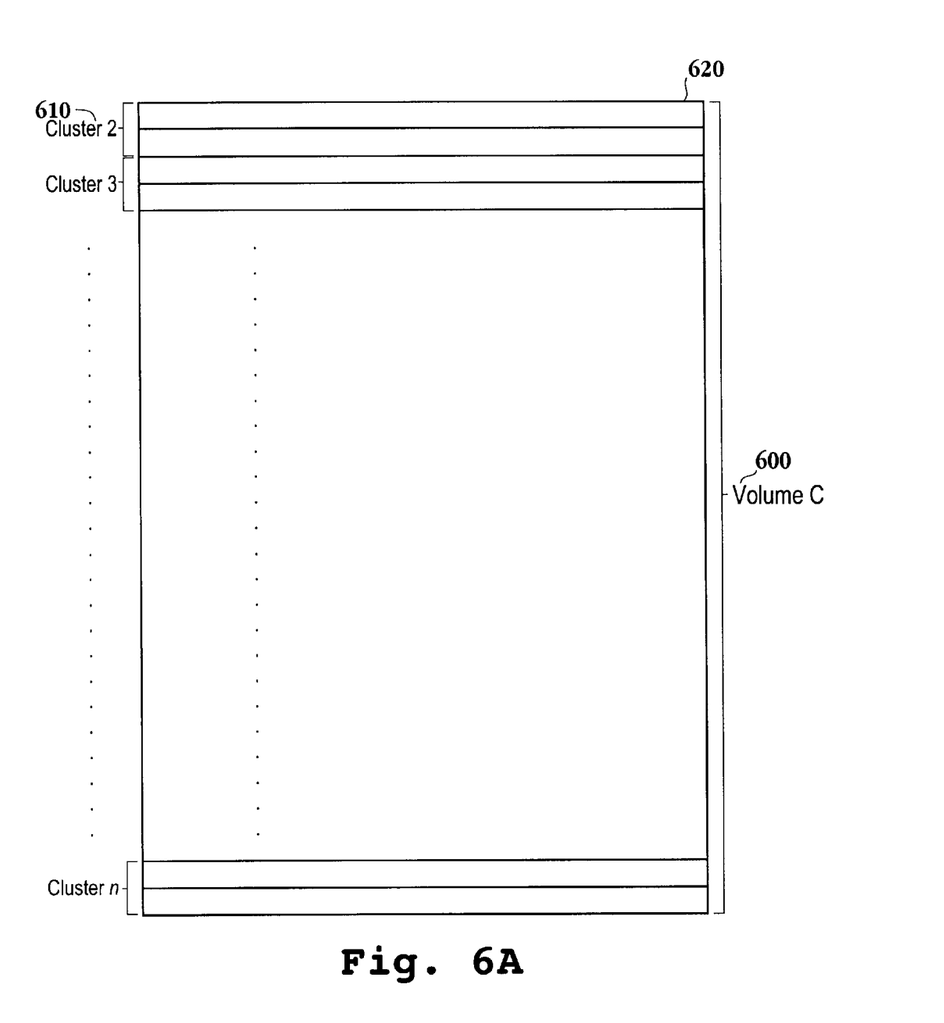
FIG. 6a illustrates the logical structure of a storage device subdivided in clusters two sectors in size.
Figure 6B:
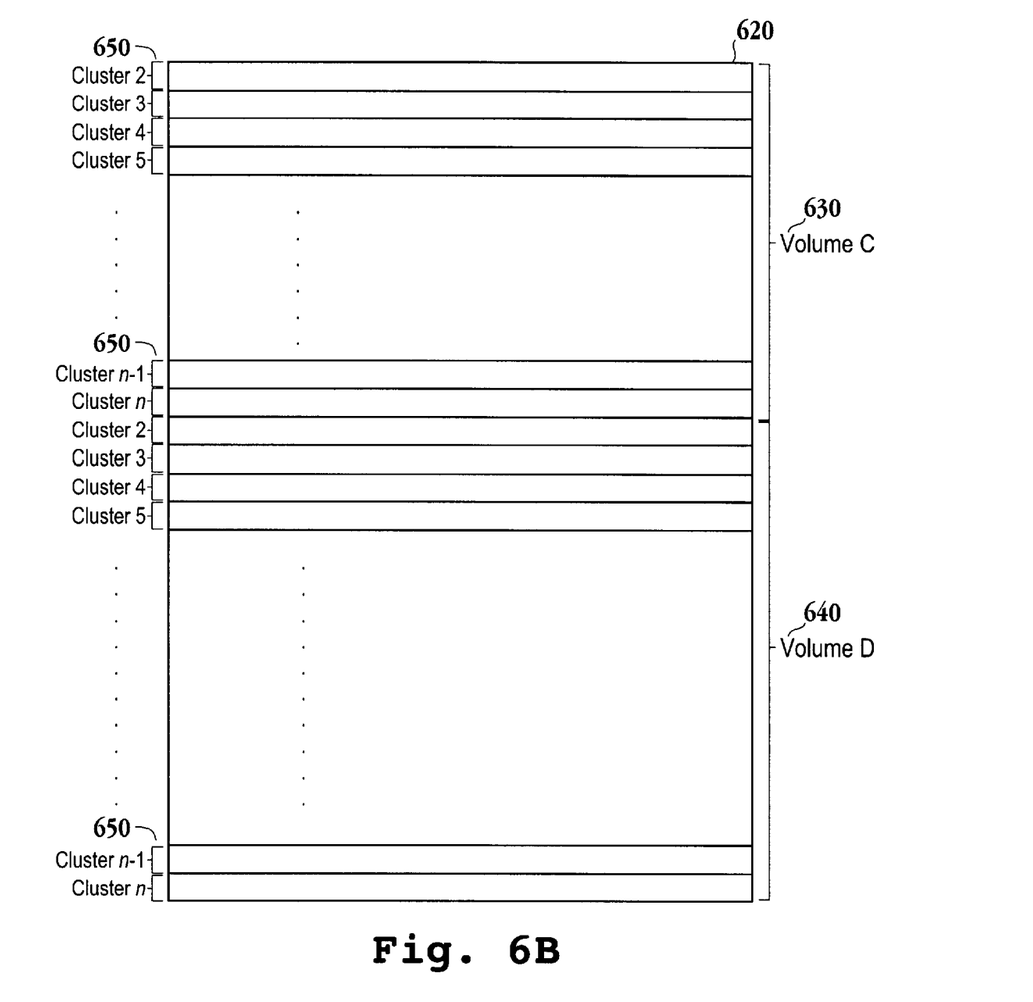
FIG. 6b illustrates the logical structure of a storage device subdivided in two partitions, each with clusters one sector in size.

ClusterBuster improves storage allocation efficiency by allowing the user/application to subdivide each physical volume into smaller partitions, which in turn results in a smaller cluster size. FIG. 6A shows a storage device with a single logical volume 600 divided in n clusters 610, each two disk sectors 620 in size. FIG. 6B shows the same storage device with two logical volumes, volume 630 and volume 640, each having n clusters 650, each one disk sector 620 in size.

When the file system stores a file on a logical volume/partition, the file system determines the number of clusters necessary to hold the entire file. For example, in a partition with a cluster size of 32 kb, a file 179 kb long would require 6 clusters, with 5 clusters completely full and a sixth cluster containing the remaining 19 kb. However, if the file size is small with respect to the size of the clusters, this can result in substantial waste of storage space.

Figure 7A:
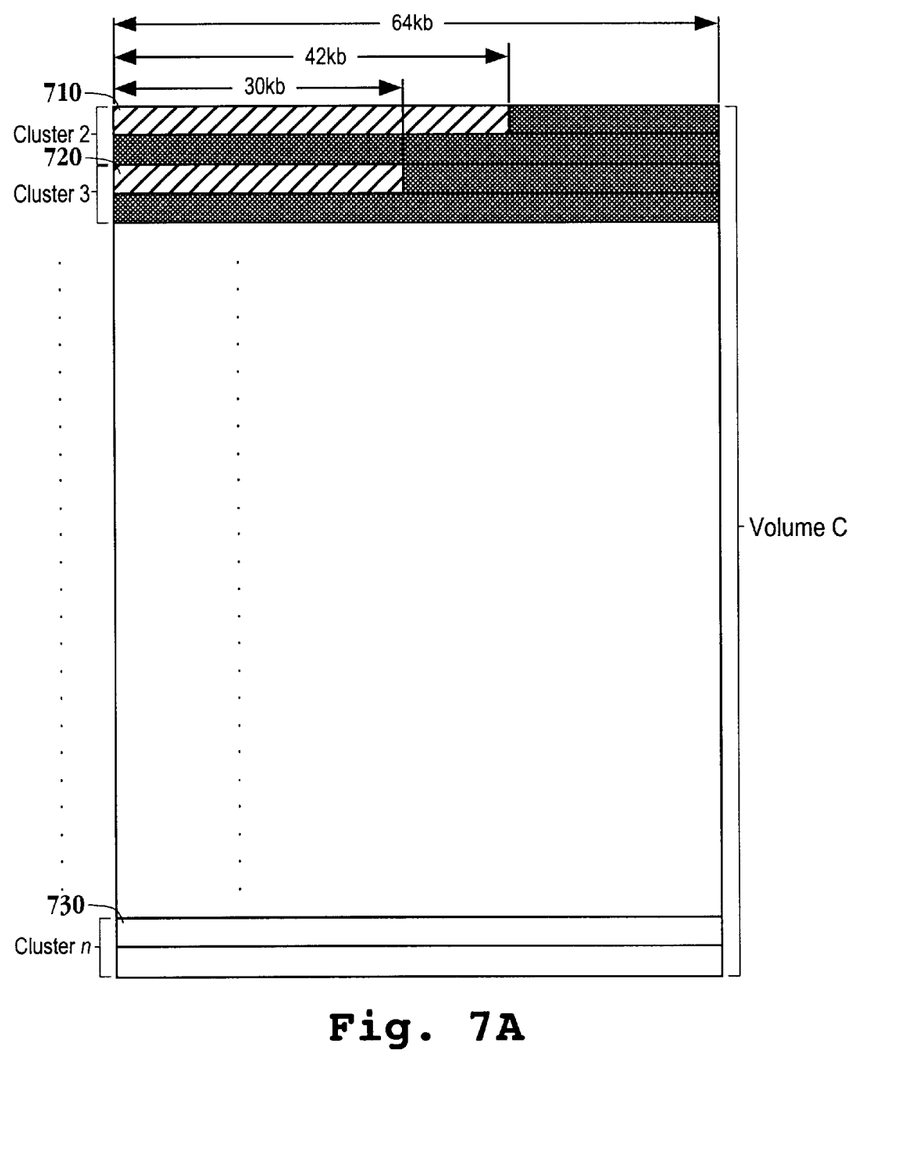
FIG. 7a shows the logical structure of the device of FIG. 6a in which two files have been stored according to the prior art.

FIG. 7a shows the storage device of FIG. 6a in which two files, file 710 and file 720, respectively 42 kb and 30 kb in size, have been stored. Since each disk sector 730 is 64 kb long, the size of clusters in volume C 700 is 128 kb. As a result, each file is stored in one cluster. Since file 710 is 42 kb long, there are 86 kb unused in the cluster 740 in which it is stored, which cannot be used by the file system. Likewise, there are 98 kb unused in the cluster 750 in which file 720 is stored. As a result, two clusters totaling 256 kb of storage space are used to store two files 72 kb in total size. The ratio of storage space used to storage space allocated is thus 28% (72/256).

Figure 7B:
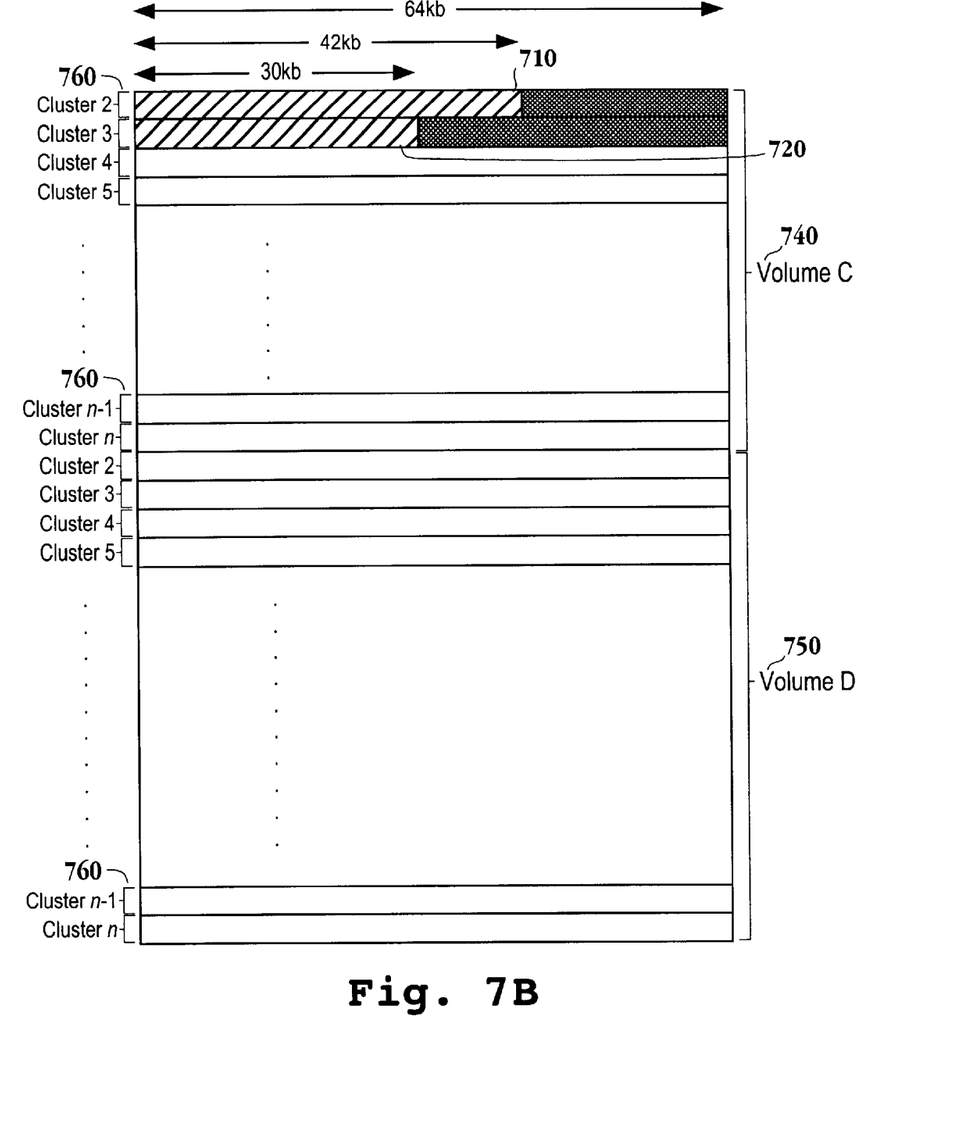
FIG. 7b shows the logical structure of the device of FIG. 6b in which two files have been stored according to an embodiment of the invention.

FIG. 7b illustrates the same device as FIG. 6a, except the storage device is now divided in two partitions, volume 740 and volume 750, just as in FIG. 6b. Since both partitions have their own FAT, the total number of FAT entries is double that of the single volume of FIG. 7a. As a result, the size of cluster 760 will be half the size of cluster in volume C 700, shown in FIG. 7a (i.e. 64 kb). If the same files are stored on the device, each will require a cluster 760. The cluster containing file 710 has 22 kb unused and the cluster containing file 720 has 32 kb unused. As a result, the ratio of storage space used to storage space allocated is 56% (72/128). Thus, by partitioning the device in two separate volumes, the storage allocation efficiency has been doubled.

Figure 8A:
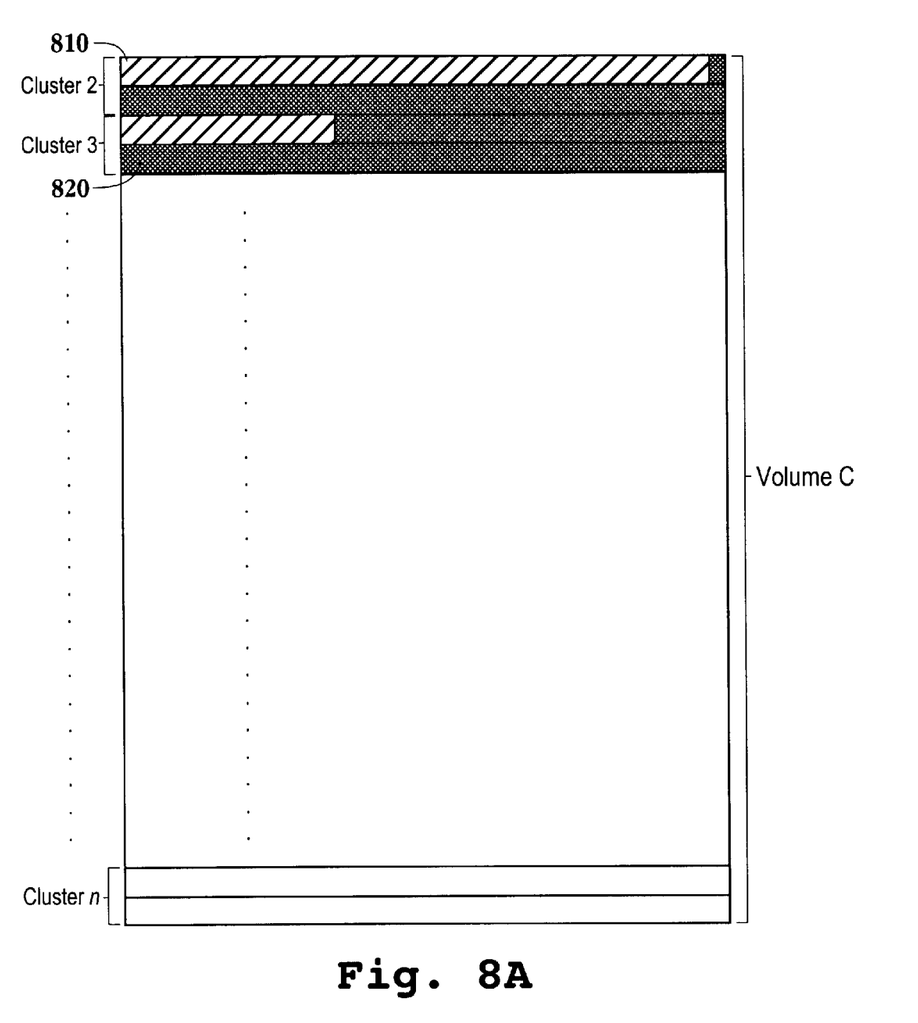
FIG. 8a shows the logical structure of the device of FIG. 6a in which two files have been stored according to the prior art.
Figure 8B:
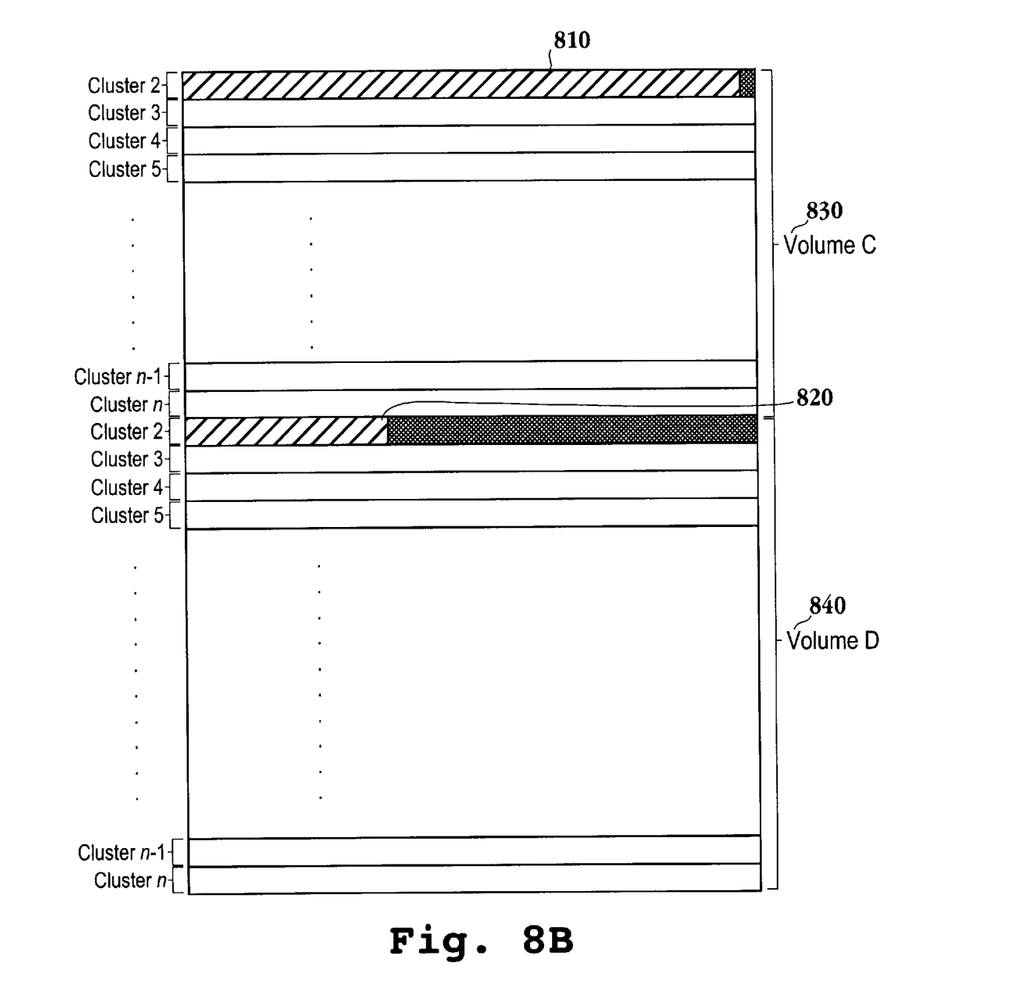
FIG. 8b shows the logical structure of the device of FIG. 6b in which two files have been stored according to an embodiment of the invention.

In addition, the preferred embodiment attempts to balance the storage allocation among different volumes, as shown in FIGS. 8A and 8B. FIG. 8a illustrates the storage device of FIG. 6a, in which files 810 and 820 have been stored. FIG. 8b illustrates the storage device of FIG. 6a, now divided in two partitions, volume 830 and volume 840, in which the same two files, file 810 and file 820 have been stored. Unlike in the example shown in FIGS. 7a–b, the files are now distributed among volume 830 and 840, resulting into a more balanced storage allocation among volumes.

When opening or creating files, ClusterBuster uses two criteria for deciding which actual logical volume to create the file on. The first priority is to keep all files from a given subdirectory together if feasible. Thus, if we were to create the file C:\Dir_Two\File.5 using the above scenario, the file would actually be created on the D: drive, since that's where the rest of the directory's files reside. The only case where this doesn't apply is when there is not enough space remaining on the D: drive, in which case the file and pertinent subdirectories would be created on the C: drive. The amount of space where this switch takes place is determined by a threshold value.

On the other hand, when an entirely new file or directory is created, the file or directory is created on the drive that has the most available space at the time of creation. Assuming that directories are always created before the file is created, this strategy balances the load onto all the drives.

Figure 9:
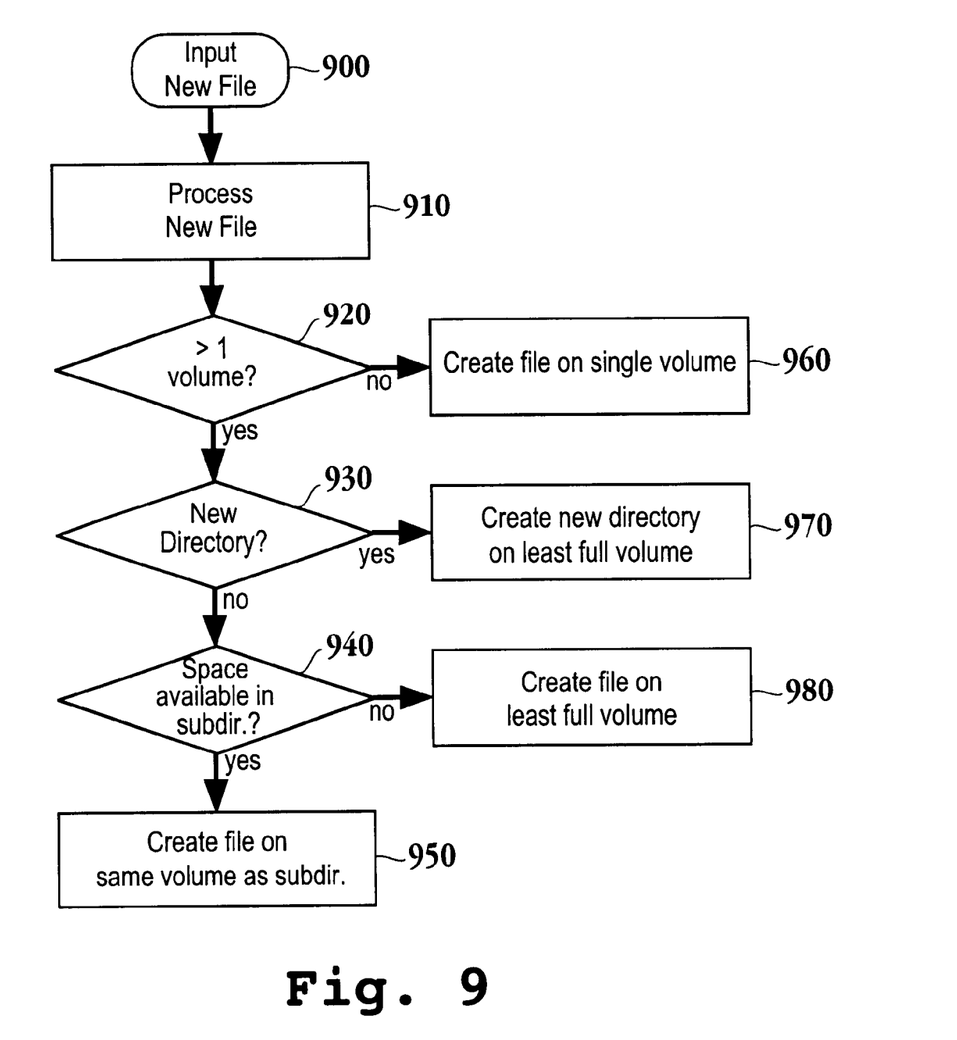
FIG. 9 is a flow diagram illustrating the process of storing a file on a storage device according to an embodiment of the invention.

This process is described in greater detail by the flow diagram in FIG. 9. The first step of the process is the actual inputting step 900. The newly inputted file is then processed in stage 910. Once the file has been processed by the application and the operating system, ClusterBuster determines in stage 920 whether there are multiple partitions. If there is only one partition, the new file is created on that partition in stage 960. Otherwise, ClusterBuster goes on to determine if the file is to be created in a new directory or in an already existing one in stage 930. If the file is to be created in a new directory, the new directory and file are created on the volume with the largest amount of storage space available in stage 970. Otherwise, ClusterBuster determines if there is sufficient space available in the subdirectory in stage 940. If there is sufficient space available, the file is created on the same volume as the other files in the subdirectory in stage 950. Otherwise the file is created in a new subdirectory on the volume with the largest amount of storage space available in stage 980.

When finding files, ClusterBuster performs the find onto all drives that are inclusive of the search path. For example, using the example above, if we were asked to find all the file in the sub-directory C:\Dir_Two, we would not search the C: drive since there are no instances of that directory on that drive. If instead the search were in the root directory of the virtual C: drive, we would perform a search on both the C: and the D: drives, since each has references to that directory.

Figure 10:
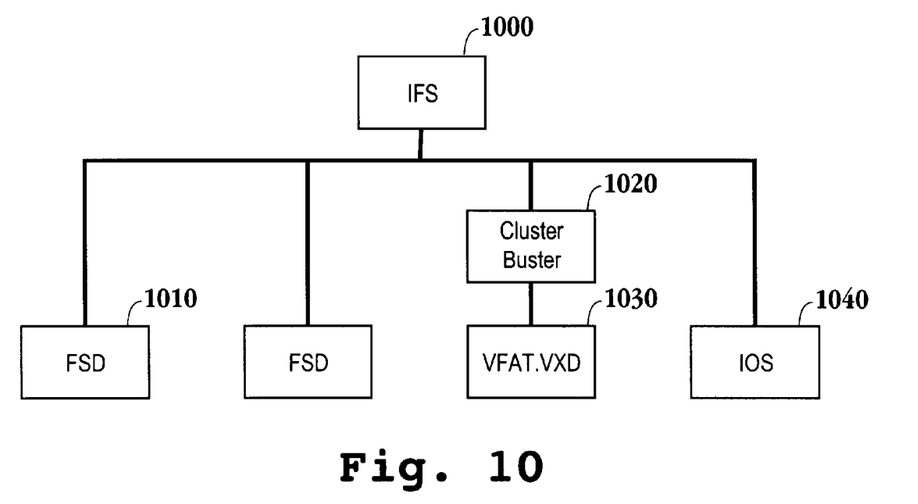
FIG. 10 is a block diagram of the Installable File System used by the WINDOWS 95 operating system according to an embodiment of the invention.

ClusterBuster works within the Windows 95 file system. In Windows 95, all file system requests are given first to the installable file system manager (IFS) 1000, shown in FIG. 10. Beneath the IFS manager 1000 are the file system drivers (FSD's) 1010 and the I/O supervisor (IOS) 1040. Each FSD 1010 is responsible for a specific type of file system. Of interest for this discussion is the FSD 1030 associated with the FAT file system (VFAT.VXD). ClusterBuster 1040 works by inserting itself between IFS manager 1000 and VFAT.VXD 1030 and translating each file system request, as appropriate. Using the above example, the IFS manager would receive the request for C:\Dir_Two\File.3 and pass it on to ClusterBuster 1040, that in turn would translate the call to D:\Dir_Two\File.3 and pass it to VFAT VXD 1030. This insertion is done using the IFSMgr_InstallFileSystemApiHook function. The ClusterBuster module intercepts all relevant file system calls and makes them appear as if there were a single volume present in the system. This includes calls to open or create files or directories, reading and writing of files, finding files, and getting current system information.

For file system information calls, every effort is made to translate the calls to reflect the current state of the system. But due to the nature of the calls and the disparate devices that lie beneath ClusterBuster, many calls will not be fully correct. As an example, if ClusterBuster is asked about the current cluster size and it is currently using multiple drives with different cluster sizes it can only come up with a value that represents the overall system average, rather than the actual values present. Other calls that directly access the device or perform device I/O control calls are passed through unaltered. This allows applications such as ScanDisk or a defragmenter to run without problems.

We claim:

1. A method for merging together a plurality of partitioned volumes of a storage device in order to present the plurality of partitioned volumes as a single volume to a user, the method comprising:

providing a translator above a file management system layer, the translator being between a file system manager and a file system driver in communication with the file system manager;

generating a file system request from the file system manager, the file system request configured to operate on the single volume;

interpreting the file system request through the translator so that the file system request is enabled to operate on the plurality of partitioned volumes; and passing the interpreted request directly to the file system driver.

2. The method as recited in claim 1, further including:

executing the interpreted request;

issuing a completion status to the translator; and notifying an application of the completion status.

3. A method for presenting a plurality of volumes of a storage device of a general purpose computer as a single volume to a user, the method comprising:

presenting the single volume to the user, the single volume being a virtual volume;

generating a first application call for a file from a single volume file management system;

converting the first application call for the file to a second application call for the file, the converting performed above the file management system layer;

transmitting the second application call directly to a multiple volume file management system; and accessing the file from the plurality of volumes of the storage device.

4. A general purpose computer, comprising;

a storage device capable of storing files, the storage device partitioned into a plurality of volumes, the plurality of volumes presented to a user as a single volume;

a file system manager, the file system manager configured to receive requests from an operating system, the requests configured to identify at least one of the files of the storage device wherein the storage device is operated as a single volume;

a translator, the translator configured to receive requests passed on from the file system manager, the translator further configured to translate the requests for the at least one of the files of the storage device wherein the storage device is partitioned into the plurality of volumes; the translator located above a file management system layer; and a file system driver, the file system driver configured to receive the translated requests directly from the translator, the file system driver configured to identify the at least one of the files on the storage device partitioned into the plurality of volumes.

5. The general purpose computer as recited in claim 4, wherein the translator is further configured to determine a volume of the storage device with the largest amount of storage space for storing a new file.

6. The general purpose computer as recited in claim 4, wherein the translator includes a table for converting file requests for files stored as the single volume to file requests for files stored as the plurality of volumes.

7. The computer of claim 4, wherein the translator further comprises a table of entries, each entry corresponding to a cluster and specifying an address of a memory location in the storage device at which a next cluster is stored, wherein each of the plurality of volumes has a fixed number of clusters.

8. The computer of claim 7, wherein a number of entries in the table is equal to the number of clusters.

9. The computer of claim 7, wherein a number of entries in the table is fixed.

10. A computer readable media having program instructions for merging together a plurality of partitioned volumes of a storage device in order to present the plurality of partitioned volumes as a single volume to a user, the computer readable media comprising:

program instructions for providing a translator above a file management system layer, the translator being between a file system manager and a file system driver in communication with the file system manager;

program instructions for generating a file system request from the file system manager, the file system request operating based on the single volume;

program instructions for interpreting the file system request through the translator so that the file system request is enabled to directly operate on the plurality of partitioned volumes; and program instructions for passing the interpreted request to the file system driver.

11. A method for adding a file to a plurality of volumes of a storage device of a general purpose computer presented as a single volume to a user, the method comprising:

presenting the single volume to the user, the single volume being a virtual volume;

generating a request to add the file to the storage device;

delivering the request to a translator located above a file management system layer, the translator being between a file system manager and a file system driver in communication with the file system manager;

determining through the translator if a subdirectory associated with the file exists in one of the plurality of volumes;

if the subdirectory associated with the file exists in one of the plurality of volumes, then adding the file to the one of the plurality of volumes;

if the subdirectory associated with the file does not exist in one of the plurality of volumes, then adding the file to one of the plurality of volumes having most space available.

* * * * *